US010368303B1

(12) United States Patent
Law et al.

(10) Patent No.: US 10,368,303 B1
(45) Date of Patent: Jul. 30, 2019

(54) MULTI-CHANNEL RF SYSTEM WITH OFF-CHANNEL SCANNING

(71) Applicant: Marvell International Ltd., Hamilton (BM)

(72) Inventors: Chor-Teck Law, Fremont, CA (US); Hongyuan Zhang, Fremont, CA (US); Sergey Timofeev, Mountain View, CA (US); Mao Yu, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/868,526

(22) Filed: Jan. 11, 2018

Related U.S. Application Data

(60) Provisional application No. 62/446,242, filed on Jan. 13, 2017.

(51) Int. Cl.
*H04W 48/16* (2009.01)
*H04W 84/12* (2009.01)

(52) U.S. Cl.
CPC ............ *H04W 48/16* (2013.01); *H04W 84/12* (2013.01)

(58) Field of Classification Search
CPC .................................................... H04W 48/16
See application file for complete search history.

(56) References Cited

U.S. PATENT DOCUMENTS

| 2007/0014267 A1* | 1/2007 | Lam ......................... H04Q 7/24 |
| 2010/0118830 A1* | 5/2010 | Stephenson ........... H04W 36/08 |

* cited by examiner

*Primary Examiner* — Ronald B Abelson

(57) ABSTRACT

A radiofrequency system includes a plurality of transceivers providing a plurality of channels, and circuitry configured to perform off-channel functions. A first subset of channels performs radiofrequency communication functions, and a second subset of channels provides signals for the off-channel functions. The first subset of channels may be provided by a first subset of transceivers, and the second subset of channels may be provided by a second subset of transceivers. A spectrum sensing unit may select between the first subset of transceivers and the second subset of transceivers. The circuitry configured to perform the off-channel functions may use the second subset of the plurality of channels to perform neighborhood discovery. The circuitry configured to perform the off-channel functions may scan available communications channels for interference, storing identifications of interference-free channels, and, upon detection of interference on a channel in use, may select one of the interference-free channels.

18 Claims, 2 Drawing Sheets

MULTI-CHANNEL RF SYSTEM WITH OFF-CHANNEL SCANNING

CROSS REFERENCE TO RELATED APPLICATION

This claims the benefit of copending, commonly-assigned U.S. Provisional Patent Application No. 62/446,242, filed Jan. 13, 2017, which is hereby incorporated by reference herein in its entirety.

FIELD OF USE

This disclosure relates to a multi-channel RF system with off-channel scanning and a method of operating such a system, and particularly to such a system operating under the 802.11 protocol.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Certain known radiofrequency systems may operate on a plurality of channels selected from a larger group of available channels. The selection may be based on conditions on the various channels. If conditions on one channel necessitate changing to a new channel, the time necessary to find a new channel may cause a degradation in performance.

SUMMARY

A radiofrequency system according to implementations of the subject matter of this disclosure includes a plurality of transceivers providing a plurality of channels, and circuitry configured to perform off-channel functions. A first subset of the plurality of channels performs radiofrequency communication functions, and a second subset of the plurality of channels provides signals for the off-channel functions.

Such a radiofrequency system may operate under a protocol providing for first channels having a first bandwidth and second channels including two of the first channels and having a second bandwidth that is twice the first bandwidth, and the second subset of the plurality of channels includes one of the first channels that is included in one of the second channels. In such an implementation, another of the first channels that is included in the one of the second channels may perform the radiofrequency communications functions.

In such a radiofrequency system, the first subset of the plurality of channels may be provided by a first subset of the plurality of transceivers, and the second subset of the plurality of channels may be provided by a second subset of the plurality of transceivers. Such an implementation may further include a spectrum sensing unit for selecting between the first subset of the plurality of transceivers that performs radiofrequency communication functions and the second subset of the plurality of transceivers that provides signals for the off-channel functions.

In such a radiofrequency system, the circuitry configured to perform the off-channel functions may use the second subset of the plurality of channels to perform neighborhood discovery.

In such a radiofrequency system, the circuitry configured to perform the off-channel functions may scan available communications channels for interference, and may include memory that stores identifications of interference-free channels, and, upon detection of interference on a channel in use in the first subset of the plurality of channels, may select one of the interference-free channels whose identification is stored, for use in the first subset of the plurality of channels.

In such an implementation, the first subset of the plurality of channels performs communication may function according to the 802.11 standard, the available communications channels may be frequencies used according to the 802.11 standard, and the circuitry configured to perform the off-channel functions may use the second subset of the plurality of channels to scan for microwave interference on the frequencies used according to the 802.11 standard.

In one variant of such an implementation, the microwave interference is radar interference. In such a variant, the circuitry configured to perform the off-channel functions may include circuitry configured to perform dynamic frequency selection.

In such a radiofrequency system the second subset of the plurality of channels may include only one channel.

In such a radiofrequency system, the first subset of the plurality of channels may perform communication functions according to the 802.11 standard, and the circuitry configured to perform the off-channel functions may use the second subset of the plurality of channels to scan for microwave interference on frequencies used according to the 802.11 standard.

A method according to implementations of the subject matter of this disclosure for operating a radiofrequency system, including a plurality of transceivers providing a plurality of channels and circuitry configured to perform off-channel functions, includes using a first subset of the plurality of channels to perform radiofrequency communication functions, and using a second subset of the plurality of channels to provide signals for the off-channel functions.

In such a method, the using a first subset of the plurality of channels to perform radiofrequency communication functions may include operating the first subset of the plurality of channels under a protocol providing for first channels having a first bandwidth and second channels including two of the first channels and having a second bandwidth that is twice the first bandwidth, and the using a second subset of the plurality of channels to provide signals for the off-channel functions may include using one of the first channels that is included in one of the second channels.

Such a method may further include using another of the first channels that is included in the one of the second channels to perform the radiofrequency communications functions.

In such a method, the using a second subset of the plurality of channels to provide signals for the off-channel functions may include using the second subset of the plurality of channels to perform neighborhood discovery.

In such a method, the using a second subset of the plurality of channels to provide signals for the off-channel functions may include using the second subset of the plurality of channels to scan available communications channels for interference. Such a method may further include storing identifications of interference-free channels and, upon detection of interference on a channel in use in the first subset of the plurality of channels, selecting one of the interference-free channels whose identification is stored, for use in the first subset of the plurality of channels.

In such an implementation of the method, the first subset of the plurality of channels may performs communication functions according to the 802.11 standard, the available communications channels may be frequencies used according to the 802.11 standard, and the circuitry configured to perform the off-channel functions may uses the second subset of the plurality of channels to scan for microwave interference on the frequencies used according to the 802.11 standard. In a variant of such an implementation, the microwave interference may be radar interference. In such a variant, the off-channel functions may include dynamic frequency selection.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
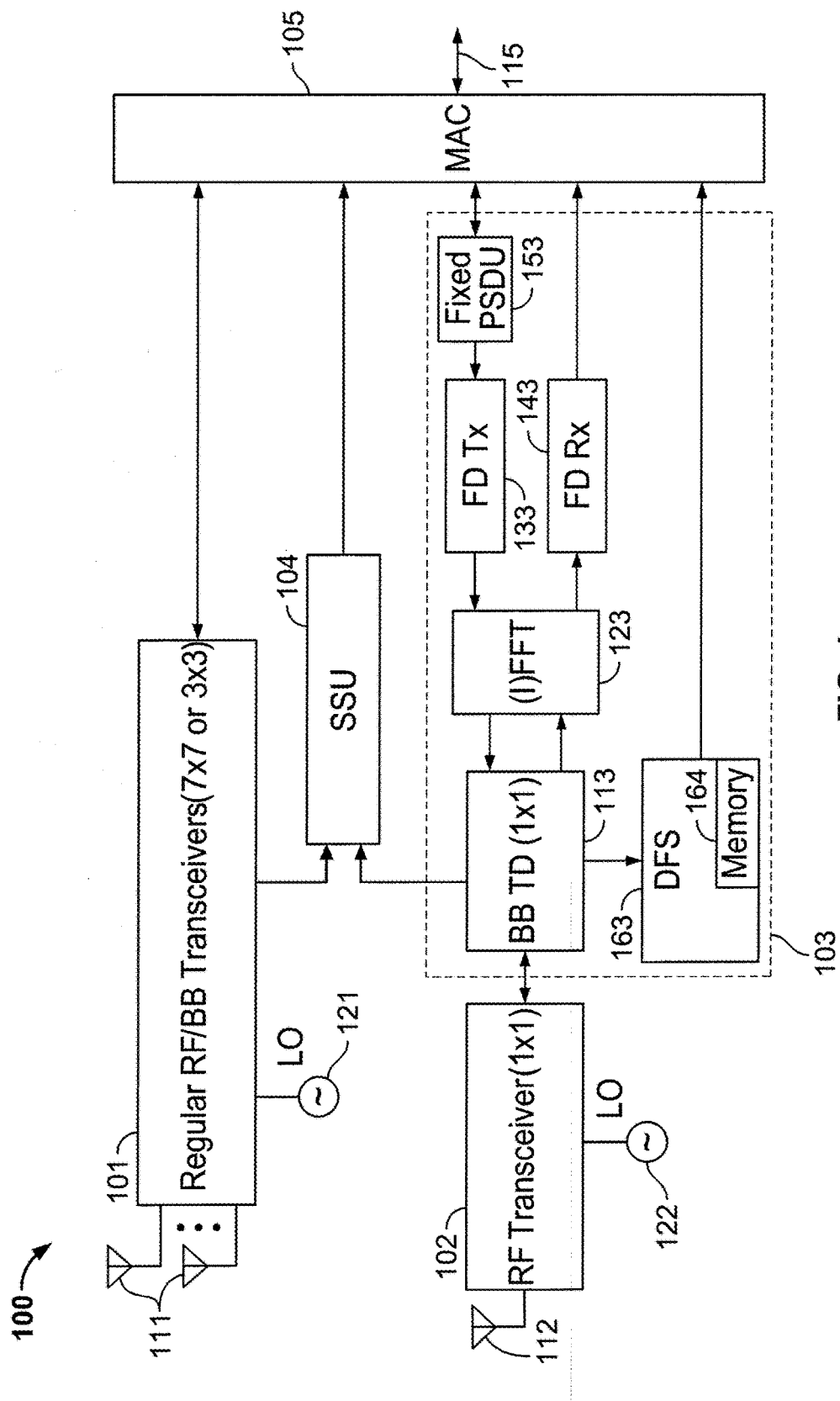
FIG. 1 is a block diagram of representative transceiver circuitry according to the subject matter of this disclosure.

As noted above, certain known radiofrequency systems may operate on a plurality of channels selected from a larger group of available channels. The selection may be based on conditions on the various channels. If conditions on one channel necessitate changing to a new channel, the time necessary to find a new channel may cause a degradation in performance. Implementations of the subject matter of the present disclosure allow off-channel scanning of other available channels so that a list of available channels of suitable quality exists, and when any channel that is in use becomes unusable for any reason, traffic on that channel can be switched to a new channel from the list of available channels of suitable quality, rather than having to wait to find a suitable new channel.

For example, in Wi-Fi systems (i.e., those operating under the 802.11 standard), there are a large number of potential channels. A particular system may use a smaller number of that group of potential channels. For example, a system might have eight transmitter/receiver pairs, each with a corresponding antenna; such a system may be characterized as an 8×8 system. Many other sizes of system may be used, and the number of transmitters and receivers may not be the same, meaning that there can be, e.g., a 6×4 system, etc.

Wi-Fi frequencies overlap with radar frequencies, and therefore government regulations designate some Wi-Fi channels as protected for radar. Those regulations require that when a protected channel is being used for Wi-Fi signals, and radar is detected on the channel, the channel must be cleared of Wi-Fi signals. Moreover, any substitute channel must be scanned for 60 seconds before being used for Wi-Fi signals, to make sure that there are no radar signals on the substitute channel. The function of Wi-Fi systems that implements those regulations is referred to as Dynamic Frequency Selection (DFS).

Having to wait 60 seconds to start operating on a new channel is unacceptable in many, if not all, data applications, and particularly in streaming audio and video applications. Therefore, in accordance with implementations of this disclosure, one channel of a multi-channel radiofrequency system may be removed from normal use and used instead for "off-channel" scanning of available channels for the presence of radar signals. A list of channels clear of radar signals can be compiled and maintained based on the off-channel scanning. If a channel in use would have to be vacated because radar signals are detected, the list of channels that are clear of radar signals would already be available, having been compiled and maintained based on the off-channel scanning. Moreover, because those clear channels would have been scanned as part of the off-channel scanning for more than 60 seconds, any one of those channels could be used immediately and still comply with the aforementioned regulations, eliminating any interruption in data traffic.

Off-channel scanning in accordance with implementations of the subject matter of this disclosure can be used to scan for other forms of interference than radar signals. Although there may not be regulations requiring scanning for such interference, off-channel scanning for such interference, and the maintenance of lists of interference-free channels, can improve the performance of any radiofrequency system.

For example, still considering a Wi-Fi-type system, potential sources of interference other than radar include microwaves, Bluetooth® transmissions, and cordless telephone signals. If a Wi-Fi signal begins to degrade because, e.g., someone turns on a microwave oven or activates a cordless telephone in the vicinity, the system would have to select a new Wi-Fi channel. If a list of channels known to be clear of interference already existed, a new channel could be selected without delay.

Wi-Fi systems are known to be operable to agglomerate two channels of a base bandwidth into a single channel of double bandwidth. In many implementations, the normal base bandwidth is 80 MHz, so channels may be combined to create fewer channels of greater bandwidth—i.e., 160 MHz. These systems are referred to as 80+80 systems. In 80+80 systems, in accordance with implementations of the subject matter of this disclosure, instead of giving over an antenna and a transceiver to off-channel scanning, half of an 80+80 channel can be used for off-channel scanning. In most applications, insofar as 80 MHz of bandwidth will remain for data, which is a standard Wi-Fi bandwidth, the reduction in bandwidth likely will not be noticeable to users.

Moreover, implementations of the subject matter of the present disclosure may be used in other kinds of multi-channel radiofrequency systems that are subject to interference to scan for clear channels. In addition, rather than scanning for clear channels, implementations of the subject matter of this disclosure may be used for, e.g., neighborhood discovery.

According to implementations of the subject matter of this disclosure, one form of signaling scheme for off-channel scanning may transmit a small packet (e.g., smaller than 200 bytes) with known content in a legacy format—i.e., a basic packet format of the 802.11 protocol that would be receivable by all 802.11 stations operating in the given channel, irrespective of individual station's configuration or capabilities. The system would scan for the packet at a receiver location. The received packet may include a PHY Header, a received signal strength indicator (RSSI), a MAC Header, and possibly MAC data (again preferably smaller than 200 bytes. Comparing the received packet to the transmitted packet provides information regarding the status of the channel.

An example of one implementation of transceiver circuitry 100 according to the subject matter of this disclosure is shown in FIG. 1, and includes dedicated hardware for off-channel scanning. Transceiver circuitry 100 is the wireless media access control (MAC) unit of an 8×8 or 4×4 transceiver system having either three or seven radiofrequency (RF)/baseband (BB) transceivers 101, including antennas 111 and a local oscillator (LO) 121.

A fourth or eighth RF transceiver 102, including antenna 112 and local oscillator (LO) 122, is provided to perform the off-channel function. The frequency of LO 122 may be the same as, or different from, the frequency of LO 121, depending on the center frequencies of the different channels. Baseband circuitry 103 associated with off-channel RF transceiver 102 is provided to perform the off-channel function, which in this example is DFS, but also may be clear channel searching for channels clear of other forms of interference, or neighborhood discovery (analyzing the complete radiofrequency environment), or other functions.

Off-channel baseband circuitry 103 includes baseband transceiver circuitry 113 coupled to RF transceiver 102 and to Fast Fourier Transform (FFT) circuitry 123. Fast Fourier Transform circuitry 123 transforms signals between the time domain, in which baseband transceiver circuitry 113 operates, and the frequency domain, and also operates to perform Inverse Fast Fourier Transform (IFFT) operations in the other direction. The frequency domain side of Fast Fourier Transform circuitry 123 is coupled to frequency domain transmitter circuitry 133 and frequency domain receiver circuitry 143. Frequency domain transmitter circuitry 133 receives Physical Layer Service Data Units 153 from user circuitry for transmission.

Baseband transceiver circuitry 113 also is coupled to scanning circuitry 163, which may be circuitry configured to perform DFS, or to perform more general scanning for interference or to perform neighborhood discovery. Scanning circuitry 163 include memory 164 for storing, e.g., a list of clear channels discovered as described above. In addition, RF/BB transceivers 101 and baseband transceiver circuitry 113 are coupled to Spectrum Sensing Unit (SSU) 104, which allows transceiver circuitry 100 to operate over a channel path including RF/BB transceivers 101, and an off-channel path including off-channel circuitry 102/103. SSU 104 can process both the channel path and the off-channel path in parallel, or can select one of those paths for processing at any one time.

Both RF/BB transceivers 101 and off-channel circuitry 102/103 implement functions of the 802.11 protocol, such as encoding or decoding packets. SSU 104 does not duplicate that functionality, and is only responsible for functions described above to implement the subject matter of this disclosure, such as interference detection and classification (e.g., is the interference from Bluetooth transmissions, a microwave oven, etc.?). Accordingly, RF/BB transceivers 101 and off-channel circuitry 102/103, as well as SSU 104, are coupled directly to media access control (MAC) circuitry 105, which is coupled to upper protocol layers at 115 for system usage.

Figure 2:
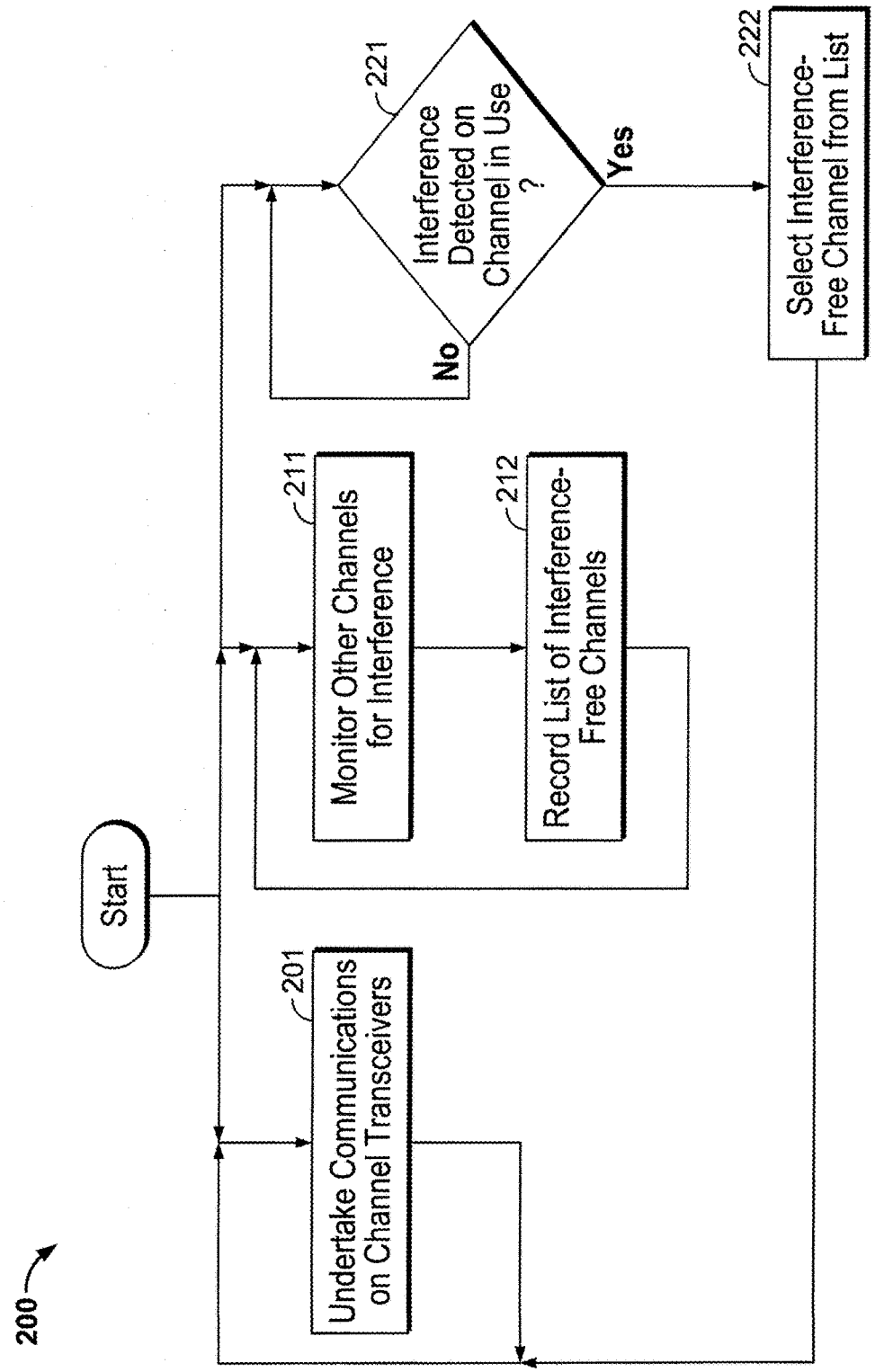
FIG. 2 is a flow diagram of a representative method according to implementations of the subject matter of this disclosure.

A example of a method 200, according to implementations of the subject matter of the present disclosure, for performing DFS or other discovery functions while also operating RF/BB transceivers 101, is diagrammed in FIG. 2. At 201, communication is undertaken on the channel transceivers 101. While communication is occurring at 201, other channels are being monitored at 211 by off-channel circuitry 102/103, and at 212 a list of interference-free channels is recorded or compiled (by scanning circuitry 163). While the communication is occurring at 201, and the other channels are being monitored at 211, at 221 the channel in use at 201 is monitored for interference. If interference is detected, then at 222, a different channel that is free from interference is selected from the list compiled at 212, and communications continues at 201 using the newly-selected channel.

Thus it is seen that a multi-channel radiofrequency system with off-channel scanning, and a method of operating such a system, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A radiofrequency system comprising:
a plurality of transceivers providing a plurality of channels; and
circuitry configured to perform off-channel functions; wherein:
a first subset of the plurality of channels performs radiofrequency communication functions; and
a second subset of the plurality of channels provides signals for the off-channel functions; and
the circuitry configured to perform the off-channel functions scans available communications channels for interference, and includes memory that stores identifications of interference-free channels, and, upon detection of interference on a channel in use in the first subset of the plurality of channels, selects one of the interference-free channels whose identification is stored, for use in the first subset of the plurality of channels.

2. The radiofrequency system of claim 1 wherein:
the system operates under a protocol providing for first channels having a first bandwidth and second channels comprising two of the first channels and having a second bandwidth that is twice the first bandwidth; and
the second subset of the plurality of channels comprises one of the first channels that is included in one of the second channels.

3. The radiofrequency system of claim 2 wherein another of the first channels that is included in the one of the second channels performs the radiofrequency communications functions.

4. The radiofrequency system of claim 1 wherein:
the first subset of the plurality of channels is provided by a first subset of the plurality of transceivers; and
the second subset of the plurality of channels is provided by a second subset of the plurality of transceivers.

5. The radiofrequency system of claim 4 further comprising a spectrum sensing unit for selecting between the first subset of the plurality of transceivers that performs radiofrequency communication functions and the second subset of the plurality of transceivers that provides signals for the off-channel functions.

6. The radiofrequency system of claim 1 wherein the circuitry configured to perform the off-channel functions uses the second subset of the plurality of channels to perform neighborhood discovery.

7. The radiofrequency system of claim 1 wherein:
the first subset of the plurality of channels performs communication functions according to the 802.11 standard;

the available communications channels are frequencies used according to the 802.11 standard; and the circuitry configured to perform the off-channel functions uses the second subset of the plurality of channels to scan for microwave interference on the frequencies used according to the 802.11 standard.

8. The radiofrequency system of claim 7 wherein the microwave interference is radar interference.

9. The radiofrequency system of claim 8 wherein the circuitry configured to perform the off-channel functions comprises circuitry configured to perform dynamic frequency selection.

10. The radiofrequency system of claim 1 wherein the second subset of the plurality of channels includes only one channel.

11. The radiofrequency system of claim 1 wherein:
the first subset of the plurality of channels performs communication functions according to the 802.11 standard; and
the circuitry configured to perform the off-channel functions uses the second subset of the plurality of channels to scan for microwave interference on frequencies used according to the 802.11 standard.

12. A method of operating a radiofrequency system including a plurality of transceivers providing a plurality of channels and circuitry configured to perform off-channel functions, the method comprising:
using a first subset of the plurality of channels to perform radiofrequency communication functions;
using a second subset of the plurality of channels to provide signals for the off-channel functions, including using the second subset of the plurality of channels to scan available communications channels for interference;
storing identifications of interference-free channels; and
upon detection of interference on a channel in use in the first subset of the plurality of channels, selecting one of the interference-free channels whose identification is stored, for use in the first subset of the plurality of channels.

13. The method of claim 12 wherein:
the using a first subset of the plurality of channels to perform radiofrequency communication functions comprises operating the first subset of the plurality of channels under a protocol providing for first channels having a first bandwidth and second channels comprising two of the first channels and having a second bandwidth that is twice the first bandwidth; and
the using a second subset of the plurality of channels to provide signals for the off-channel functions comprises using one of the first channels that is included in one of the second channels.

14. The method of claim 13 comprising using another of the first channels that is included in the one of the second channels to perform the radiofrequency communications functions.

15. The method of claim 12 wherein the using a second subset of the plurality of channels to provide signals for the off-channel functions comprises using the second subset of the plurality of channels to perform neighborhood discovery.

16. The method of claim 12 wherein:
the first subset of the plurality of channels performs communication functions according to the 802.11 standard;
the available communications channels are frequencies used according to the 802.11 standard; and
the circuitry configured to perform the off-channel functions uses the second subset of the plurality of channels to scan for microwave interference on the frequencies used according to the 802.11 standard.

17. The method of claim 16 wherein the microwave interference is radar interference.

18. The method of claim 17 wherein the off-channel functions comprise dynamic frequency selection.

* * * * *